Feb. 8, 1966    H. STERN    3,233,522
FLUID CONTROL SYSTEM
Filed May 28, 1963
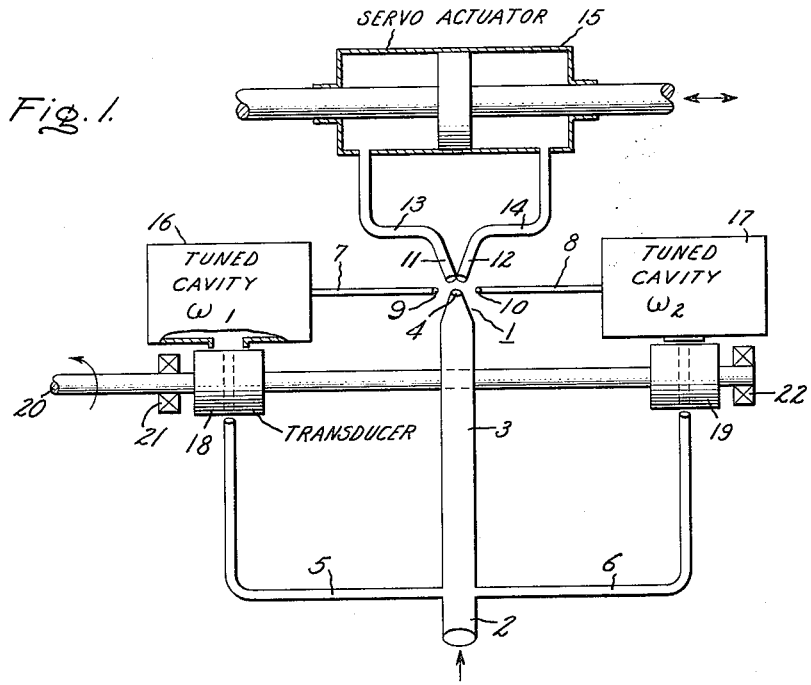
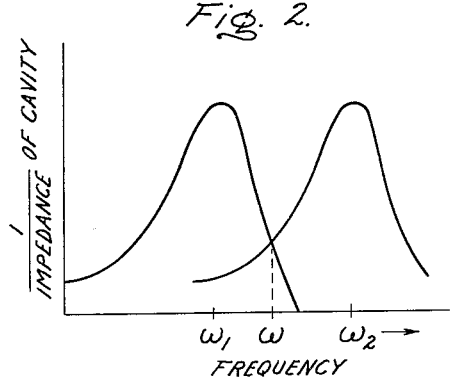
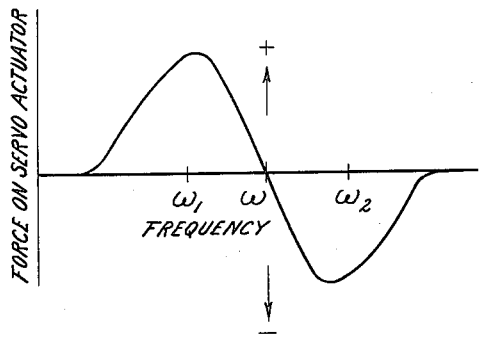
Inventor:
Hansjoerg Stern,
by Paul A. Frank
His Attorney.

United States Patent Office 3,233,522
Patented Feb. 8, 1966

3,233,522
FLUID CONTROL SYSTEM
Hansjoerg Stern, Scotia, N.Y., assignor to General Electric Company, a corporation of New York
Filed May 28, 1963, Ser. No. 283,813
5 Claims. (Cl. 91—3)

My invention relates to a fluid control system employing a fluid amplifier circuit as part of the controller element, and in particular, to the portion of the system which generates the control fluid flow utilized by the fluid amplifier.

Fluid amplifier devices are a recent development currently finding application as digital and analog computing elements. However, their application in more complex fluid control systems has found limited use due primarily to their newness. These devices feature inherent reliability, since they generally employ no moving parts, ease of fabrication, and temperature insensitivity. The devices will operate both on incompressible fluids such as liquids and compressible fluids such as gases, including air, it being understood that the material comprising the fluid amplifier be compatible with the fluid passing therethrough. As a result, they are ideal for applications where nuclear radiation, high temperature, vibration, and shock may be present.

Fluid amplifiers operate on the basis of deflecting a fluid power jet. In the conventional form, a constant main fluid flow comprising a relatively high pressure power jet issues from a nozzle and impinges upon at least one of two fluid flow receivers. A deflection or control of the power jet is obtained by imparting sideways momentum thereto by means of control fluid flow comprising relatively low pressure control jets issuing from a pair of control nozzles positioned in opposing relationship to the power jet and directed laterally thereto. The magnitude of power jet deflection is proportional to the net sideways momentum imparted by the control jets in the class of fluid amplifiers generally known as the analog type. Deflection of the power jet results in one receiver obtaining more flow or recovering a higher pressure while the other receiver obtains or recovers less. Since the deflection is proportional, the output flow or pressure at the receivers is proportional to the net input flow or pressure at the control nozzles.

Fluid control systems are useful for controlling the rotational speed of apparatus such as turbines, engines, or hydraulic motors. A particular problem with prior fluid control systems of this type has been the factor of reliability. The prior systems generally employ many moving parts which are sensitive to vibration and thereby subject to erratic behavior or breakdown.

Therefore, one of the principal objects of my invention is to provide a fluid control system employing a fluid amplifier circuit as part of the controller element whereby the system has relatively few moving parts and resultant improved reliability.

Various system conditions or parameters are often required to be controlled in the more complex apparatus of present day technology. These parameters may include rotational speed, frequency, pressure, temperature, and particular functions of a plurality of such parameters.

Therefore, another important object of my invention is to provide a fluid control system employing a fluid amplifier circuit wherein the system is adapted to control a specific parameter or a particular function of a plurality of system parameters.

Briefly stated, and in accordance with my invention, I provide a fluid control system wherein a fluid amplifier circuit comprises the controller element. The fluid amplifier supplies a fluid force to an actuator element for restoring a particular system parameter to a desired value in response to a deviation therefrom. The amplifier is made responsive to the parameter deviation by means of two fluid impedances having impedance values which vary with the frequency or pulsation of control fluid flow. A first of such impedances resonates at a frequency below a particular frequency which represents the desired value of the system parameter to be controlled, and the second impedance resonates above such particular frequency. The two impedances are employed, respectively, in two control fluid passages of the amplifier whereby the magnitude of each pulsating control fluid flow is determined by the proximity of the control fluid flow frequency to the impedance resonant frequency. Suitable transducers are provided at the input to the impedances to convert the system parameter to a pulsating fluid flow having a frequency which is proportional to the magnitude of the system parameter. Thus, a deviation of the system parameter from its desired value results in an unbalanced control fluid flow to the amplifier, thereby deflecting the power jet in such direction as to restore the system to the desired condition.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings, wherein like parts in each of the several figures are identified by the same reference character, and wherein:

FIGURE 1 is a diagrammatic view, partly in section, illustrating a fluid control system for controlling rotational speed and constructed in accordance with my invention;

FIGURE 2 is a graphical representation of the resonance characteristics of the two tuned cavities illustrated in FIGURE 1; and FIGURE 3 is a graphical representation of the force applied to the servo actuator illustrated in FIGURE 1 as a function of the frequency characteristics of the two tuned cavities.

In the fluid control system illustrated in FIGURE 1, there is shown a fluid amplifier designated as a whole by numeral 1 and comprising a source of fluid under pressure which is introduced into fluid passage 2 as indicated by the arrow. A main or power fluid passage 3 may be an extension of passage 2 and terminates in a fluid flow restrictor forming a nozzle 4 adapted to generate a main or power jet of fluid issuing therefrom. Two fluid passages 5 and 6, having a smaller cross section than main fluid passage 3, branch from passage 2 and convey the fluid which ultimately passes through control fluid passages 7 and 8. Passages 7 and 8 terminate in fluid flow restrictors forming control nozzles 9 and 10, respectively, which are adapted to generate control jets of fluid issuing therefrom. Control nozzles 9 and 10 are positioned adjacent power nozzle 4 and disposed on opposite sides of the power jet and substantially perpendicular thereto whereby each control jet is directed against an opposite side of the power jet in momentum exchange relation. A pair of fluid receiving passages 11 and 12 are disposed downstream from power nozzle 4 in a manner whereby in the presence of equal or balanced control jets issuing from nozzles 9 and 10, the non-deflected power jet is directed midway between receivers 11 and 12. The receivers may be spaced apart and the non-deflected power jet is either distributed equally between receivers 11 and 12 or passes entirely therebetween. Receivers 11 and 12 are connected to fluid passages 13 and 14, respectively, the latter passages being connected, respectively, to opposite ends or sides of a suitable servo actuator 15 which may be of the hydraulic or pneumatic type as determined by the fluid medium employed in amplifier 1. Actuator 15 is operable during an unbalanced control jet condition which causes a deflection of the power jet in a manner to be discussed in greater detail hereinafter.

It should be understood that the illustration of fluid amplifier 1 in FIGURE 1 is merely a diagrammatic representation. The actual construction of a conventional fluid amplifier device comprises a base member having a slotted surface which forms the configuration of the various flow paths such as fluid flow passages 3, 7, 8, 13, 14; nozzles 4, 9, 10; and receivers 11, 12. A cover member encloses the flow paths to form a sealed device.

A pair of fluid impedances 16, 17 having impedance values which vary with the frequency or pulsation of fluid flowing thereby are connected to the input of control fluid passages 7 and 8, respectively. Such impedances are preferably of the resonant type, each resonating at a different predetermined frequency as further described hereinafter. The impedances may comprise hollow members of suitable size, that is, tuned cavities 16, 17, such as the well-known Helmoltz resonators or organ pipes. Two identical transducers 18 and 19 of a type appropriate to convert the system parameter to be controlled to a pulsating fluid flow are connected between the outputs of fluid passages 5 and 6 and the inputs to tuned cavities 16 and 17, respectively. The particular system parameter to be controlled in the embodiment illustrated in FIGURE 1 is rotational speed of shaft 20. Thus, for the particular application, transducers 18, 19 may conveniently be devices known as choppers which are mounted on shaft 20 and comprise structures having fluid passages passing therethrough. The constant fluid flow from passages 5 and 6 thus passes through transducers 18 and 19, respectively, wherein such flow is converted to a pulsating fluid flow having a frequency of pulsation proportional to the rotational speed of shaft 20. The pulsating fluid flow exits from the transducers and enters tuned cavities 16 and 17 which have frequency resonance characteristics as illustrated in FIGURE 2. Suitable bearings 21, 22 are provided on shaft 20 for supporting the transducers. Suitable fluid means are provided at the output of tuned cavities 16 and 17 to obtain a function analogous to rectifying action in electrical circuits to eliminate back flow of the control fluid.

The system illustrated in FIGURE 1 represents a speed governor control wherein the rotational speed of shaft 20 which may be driven by a turbine, engine, or hydraulic or pneumatic motor is to be controlled or maintained at a desired speed. The control system functions in the following manner. Tuned cavities 16 and 17 are adapted to resonate, respectively, at $\omega_1$, a frequency below $\omega$, and $\omega_2$, a frequency above $\omega$ wherein $\omega$ is a desired frequency to be controlled and is proportional to the desired rotational speed of shaft 20. The frequencies are in a range between 50 c.p.s. and 10 k.c.p.s., the frquency spread between $\omega_1$ and $\omega_2$ being preferably approximately 20 percent of $\omega$. A small flow of fluid from passages 5 and 6 is metered into cavities 16, 17 through choppers 18, 19. At shaft rotational speeds below that desired to be maintained, the pulsating fluid flow generated by the transducers has a frequency below $\omega$ and thus closer to the resonance frequency $\omega_1$ of cavity 16 than $\omega_2$ of cavity 17. Thus, tuned cavity 16 supplies a larger control fluid flow to passage 7 than that provided by cavity 17 to passage 8. Such unequal control fluid flow in passages 7 and 8 produces an unequal or unbalanced control jet effect which deflects the power jet issuing from nozzle 4 toward receiver 12 and thereby produces a positive force to operate servo actuator 15 as illustrated in FIGURE 3 which is in a direction to increase the shaft speed. Actuator 15 is connected to suitable valves, throttle or stroke mechanism of the energizing portion of the apparatus which drives or rotates shaft 20. At speeds above the desired speed, tuned cavity 17 supplies a larger control fluid flow to passage 8, thereby correcting the speed of shaft 20 in the opposite direction. At the desired shaft speed, the frequency of the pulsating fluid flow generated by the transducers is $\omega$, and the control fluid flows through passages 7 and 8 are in balance and no net deflection of the power jet results. Thus, it can be appreciated that my fluid control system is adapted to maintain a desired rotational speed of shaft 20 and a deviation from this desired condition produces an error signal, that is, unbalanced control fluid flows which restore the system to the desired condition of shaft speed.

In jet engines the function $$\frac{N}{\sqrt{\theta}}$$

where N is the rotational speed of the jet engine and $\theta$ is corrected jet engine temperature, is a system parameter which is controlled to maintain jet engine top corrected speed. A gas is preferably employed as the working fluid in my control system for controlling this particular system parameter since the resonant frequency of the tuned cavities 16, 17 vary as $\sqrt{\theta}$ for a gaseous fluid. Thus, the system illustrated in FIGURE 1 may be employed in a high temperature application such as a gas turbine jet engine control to regulate top speed without the need for complicated temperature sensors. If hydraulic fluids are used for the working medium, their compressibility is also a function of temperature and the cavity resonance will thus also be temperature dependent. Over certain ranges of temperature, a thermal compensator can be introduced in the tuning cavities if resonance is to be independent of temperature.

Having described a new fluid control system employing a fluid amplifier as part of the controlling element, it is believed obvious that modifications and variations of my invention are possible in the light of the above teachings. Thus, a variety of system parameters may be controlled such as linear velocity, pressure, temperature, and any other parameter for which a suitable transducer is available to convert such parameter to a pulsating flow having a frequency of pulsation proportional to the magnitude of the system parameter. In some cases, it may be convenient to employ a single fluid passage branching from passage 2 and a single transducer having two outputs connected to cavities 16 and 17. Although the speed governor control illustrated in FIGURE 1 employs two identical transducers, there are applications wherein nonidentical transducers are utilized, such as in a system which regulates a ratio between two different speeds.

It is, therefore, to be understood that changes may be made in the particular embodiment of my invention described which are within the full intended scope of the invention as defined by the following claims.

What I claim as new and desire to secure by Letters Patent of the United States is:

1. A fluid control system for maintaining a desired value of a selected system parameter comprising— a fluid amplifier comprising a first fluid passage terminating in a first fluid flow restrictor for generating a main fluid jet to be controlled, a pair of fluid receiver means downstream from said first restrictor for receiving fluid from the main jet, and a pair of second fluid passages terminating in oppositely disposed second fluid flow restrictors for generating control fluid jets to controllably deflect the main jet relative to said receiver means, first means in fluid communication with the input to a first of said second fluid passages for generating a first pulsating flow of control fluid having a magnitude of flow responsive to deviations of said system parameter above the desired value, second means in fluid communication with the input to a second of said second fluid passages for generating a second pulsating flow of control fluid having a magnitude of flow responsive to deviations of said system parameter below the desired value, and means in fluid communication with said receiver means for restoring said system parameter to the desired value.

2. A fluid control system for maintaining a desired value of a particular system parameter comprising— a fluid amplifier comprising a first fluid passage terminating in a first nozzle for generating a power jet of fluid to be controlled, a pair of fluid receiver means downstream from said first nozzle for receiving fluid from the power jet, and a pair of second fluid passages terminating in a pair of oppositely disposed second nozzles for generating jets of control fluid to controllably deflect the power jet relative to said receiver means, first means for generating a pulsating flow of said control fluid wherein the frequency of pulsation is proportional to the magnitude of said system parameter, second means for controlling the magnitude of said pulsating control fluid flow, said second means comprising a first frequency sensitive fluid impedance responsive to deviations of said system parameter above the desired value, the output of said first impedance being connected to the input of a first of said second fluid passage, and a second frequency sensitive fluid impedance responsive to deviations of said system parameter below the desired value, the output of said second impedance being connected to the input of a second of said second fluid passages, and means in fluid communication with said receiver means for restoring said system parameter to the desired value.

3. A fluid control system for maintaining a desired magnitude of a particular system parameter comprising— a fluid amplifier comprising a first fluid passage terminating in a first nozzle for generating a power jet of fluid to be controlled, a pair of fluid receiver means downstream from said first nozzle for receiving fluid from the power jet, and a pair of second fluid passages terminating in a pair of oppositely disposed second nozzles for generating jets of control fluid to controllably deflect the power jet relative to said receiver means, means for generating a pulsating flow of said control fluid wherein the frequency of pulsation is proportional to the magnitude of the system parameter, a first fluid impedance resonant at a frequency above a selected frequency, said selected frequency representing the desired magnitude of the system parameter, a second fluid impedance resonant at a frequency below said selected frequency, the input to said first and second fluid impedance being connected to the output of said pulsating control fluid generating means, the output of said first and second fluid impedance being connected respectively to an input of a first and second of said second fluid passages whereby said jets of control fluid have magnitudes of control fluid flow determined by deviation of the frequency of pulsation of control fluid flow from said selected frequency, and means in fluid communication with said receiver means for restoring said system parameter to the desired magnitude.

4. A speed control system for maintaining a desired speed comprising— a fluid amplifier comprising a first fluid passage terminating in a first fluid flow restrictor for generating a main fluid jet to be controlled, a pair of fluid receiver means downstream from said first restrictor for receiving fluid from the main jet, and a pair of second fluid passages terminating in a pair of oppositely disposed second fluid flow restrictors for generating a pair of opposing control fluid jets to controllably deflect the main jet relative to said receiver means, transducer means for generating a pulsating flow of the control fluid wherein the frequency of pulsation is proportional to the system speed, a first tuned cavity connected to an output of said transducer means, said first cavity having a resonant frequency corresponding to a particular speed above the desired system speed, the output of said first tuned cavity being connected to an input of a first of said second fluid passages, a second tuned cavity connected to an output of said transducer means, said second cavity having a resonant frequency corresponding to a particular speed below the desired system speed, the output of said second tuned cavity being connected to an input of a second of said second fluid passages, and means responsive to a deflection of said main fluid jet resulting from an unbalanced condition of the control fluid jets for adjusting the system speed to the desired speed at which the control jets are in a balanced condition.

5. A speed control system for controlling a desired rotational speed comprising— a fluid amplifier comprising a first fluid passage terminating in a first fluid flow restrictor for generating a main fluid jet to be controlled, a pair of fluid receiver means downstream from said first restrictor for receiving fluid from the main jet, and a pair of second fluid passage terminating in a pair of oppositely disposed second fluid flow restrictors for generating a pair of opposing control fluid jets to controllably deflect the main jet relative to said receiver means, a first transducer means for generating a first pulsating flow of the control fluid wherein the frequency of pulsation is proportional to the system speed, a second transducer means for generating a second pulsating flow of the control fluid wherein the frequency of pulsation is proportional to the system speed, a first tuned cavity connected to an output of said first transducer, said first cavity having a resonant frequency corresponding to a particular speed above the desired system speed, the output of said first cavity being connected to an input of a first of said second fluid passages whereby a first of said control fluid jets is responsive to deviations of the system speed above the desired speed, a second tuned cavity connected to an output of said second transducer, said second cavity having a resonant frequency corresponding to a particular speed below the desired system speed, the output of said second cavity being connected to an input of a second of said second fluid passages whereby a second of said control fluid jets is responsive to deviations of the system speed below the desired speed, and means responsive to a deflection of said main fluid jet for adjusting the system speed to the desired speed at which a balanced condition of said control jets is obtained, said main jet deflection resulting from an undesired system speed which renders one of said tuned cavities more responsive and thereby conveys a greater control fluid flow to the said second fluid flow restrictor in fluid communicator therewith to produce an unbalanced condition of the control jets.

(References on following page)

References Cited by the Examiner

UNITED STATES PATENTS

| | | | |
|---|---|---|---|
| 1,959,889 | 5/1934 | Wunsch | 137—36 X |
| 2,485,094 | 10/1949 | Gundersen | 137—83 X |
| 2,727,525 | 12/1955 | Harris | 137—81.5 |
| 2,814,487 | 11/1957 | Medkeff | 137—81.5 X |
| 2,982,902 | 5/1961 | Gates et al. | 137—83 X |
| 3,144,037 | 8/1964 | Cargill et al. | 137—81.5 |
| 3,176,094 | 3/1965 | Ipsen | 137—36 X |
| 3,193,197 | 7/1965 | Bauer | 137—81.5 X |

M. CARY NELSON, *Primary Examiner.*

S. SCOTT, *Assistant Examiner.*